US011867600B2

(12) United States Patent
Lee et al.

(10) Patent No.: US 11,867,600 B2
(45) Date of Patent: Jan. 9, 2024

(54) ASSESSMENT METHOD FOR INJECTION MOLDING PROPERTY OF PLASTIC FORM

(71) Applicant: LG Chem, Ltd., Seoul (KR)

(72) Inventors: Hyunsup Lee, Daejeon (KR); Sung Hyun Park, Daejeon (KR); Soon Ho Sun, Daejeon (KR); Yi Young Choi, Daejeon (KR); Ki Soo Lee, Daejeon (KR); Myung Han Lee, Daejeon (KR)

(73) Assignee: LG Chem, Ltd.

( * ) Notice: Subject to any disclaimer, the term of this patent is extended or adjusted under 35 U.S.C. 154(b) by 700 days.

(21) Appl. No.: 16/640,864

(22) PCT Filed: Aug. 21, 2018

(86) PCT No.: PCT/KR2018/009609
§ 371 (c)(1),
(2) Date: Feb. 21, 2020

(87) PCT Pub. No.: WO2019/039839
PCT Pub. Date: Feb. 28, 2019

(65) Prior Publication Data
US 2021/0080367 A1 Mar. 18, 2021

(30) Foreign Application Priority Data

Aug. 22, 2017 (KR) .................. 10-2017-0106308
Sep. 22, 2017 (KR) .................. 10-2017-0122819

(51) Int. Cl.
| | | |
|---|---|---|
| G01N 11/08 | (2006.01) |
| B29C 45/00 | (2006.01) |
| G01N 25/04 | (2006.01) |
| C08F 210/16 | (2006.01) |
| B29K 105/00 | (2006.01) |

(52) U.S. Cl.
CPC .......... *G01N 11/08* (2013.01); *B29C 45/0001* (2013.01); *C08F 210/16* (2013.01); *G01N 25/04* (2013.01); *B29K 2023/06* (2013.01); *B29K 2105/0094* (2013.01); *B29K 2995/0063* (2013.01); *B29K 2995/0088* (2013.01); *C08F 2420/06* (2013.01)

(58) Field of Classification Search
CPC .... G01N 11/08; G01N 25/04; B29K 2023/06; B29K 2105/0094; B29K 2995/0063; B29K 2995/0088; B29C 45/0001; B29C 45/76; C08F 210/08; C08F 210/16; C08F 2420/06; C08F 2420/07; C08F 2420/10; C08F 2500/02; C08F 2500/12; C08F 2500/19; C08F 4/65904; C08F 4/65912; C08F 4/65916; C08F 4/65925; C08F 4/65927

See application file for complete search history.

(56) References Cited

U.S. PATENT DOCUMENTS

| | | | |
|---|---|---|---|
| 3,819,762 A | 6/1974 | Howe | |
| 4,968,462 A | 11/1990 | Hara | |
| 6,767,485 B1 | 7/2004 | Steiner | |
| 2002/0153630 A1 | 10/2002 | Kamiguchi et al. | |
| 2004/0230411 A1 | 11/2004 | Zheng et al. | |
| 2006/0022363 A1 | 2/2006 | Konno et al. | |
| 2007/0083024 A1 | 4/2007 | Ebara | |
| 2009/0062463 A1 | 3/2009 | Backmann et al. | |
| 2012/0295049 A1 | 11/2012 | Altonen et al. | |
| 2013/0245171 A1 | 9/2013 | Yao et al. | |
| 2015/0197054 A1 | 7/2015 | White et al. | |
| 2016/0333172 A1* | 11/2016 | Koch | C08L 23/06 |
| 2018/0223009 A1 | 8/2018 | Kim et al. | |
| 2019/0169323 A1 | 6/2019 | Lee et al. | |

FOREIGN PATENT DOCUMENTS

| | | |
|---|---|---|
| CN | 1780723 A | 5/2006 |
| CN | 103909637 A | 7/2014 |
| CN | 105044283 A | 11/2015 |
| EP | 3040375 A1 | 7/2016 |
| EP | 3168243 A1 | 5/2017 |
| EP | 3538571 A1 | 9/2019 |
| JP | S48062848 A | 9/1973 |
| JP | S61125814 A | 6/1986 |
| JP | H0659675 B2 | 8/1994 |
| JP | H06210659 A | 8/1994 |
| JP | H08103919 A | 4/1996 |
| JP | H10138313 A | 5/1998 |
| JP | 2002331558 A | 11/2002 |
| JP | 2003276070 A | 9/2003 |

(Continued)

OTHER PUBLICATIONS

Chinese Search Report for Application No. 201880054778.7, dated Aug. 27, 2021, 2 pages.
International Search Report from Application No. PCT/KR2018/009609 dated Apr. 11, 2019, 3 pages.
Rosen, M.R., "A Rheogram Template for Power Law Fluids", Journal of Colloid arid Interface Science, vol. 39, No. 2, May 1972, pp. 413-417.
Shida et al., "Correlation of Low Density Polyethylene Rheological Measurements with Optical and Processing Properties", Polymer Engineering and Science, vol. 17, No. 11, Nov. 1977, pp. 769-774.
Shida et al., "Prediction of High Density Polyethylene Processing Behavior from Rheological Measurements", Polymer Engineering and Science, vol. 11, No. 2, Mar. 1971, pp. 124-128.

(Continued)

*Primary Examiner* — Yan Lan
(74) *Attorney, Agent, or Firm* — Lerner David LLP

(57) ABSTRACT

The present invention relates to a method for evaluating an injection physical property of a plastic resin, and a polyethylene resin suitable for an injection molding process and, more particularly, to a novel method for evaluating an injection physical property of a plastic resin, which, when a particular plastic resin is processed by an injection process, can accurately derive injection suitability of the plastic resin and injection pressure in the injection process through a physical property value measured by using a resin specimen, and a polyethylene resin suitable for injection molding.

10 Claims, No Drawings

(56) References Cited

FOREIGN PATENT DOCUMENTS

| | | |
|---|---|---|
| JP | 200443717 A | 2/2004 |
| JP | 2005131879 | 5/2005 |
| JP | 2005241443 A | 9/2005 |
| JP | 2007268920 A | 10/2007 |
| JP | 2009156985 A | 7/2009 |
| KR | 20060021820 A | 3/2006 |
| KR | 20060109482 A | 10/2006 |
| KR | 20070084447 A | 8/2007 |
| KR | 20120105466 A | 9/2012 |
| KR | 20130105252 A | 9/2013 |
| KR | 20140001250 A | 1/2014 |
| KR | 101617870 B1 | 5/2016 |
| KR | 101723774 B1 | 4/2017 |
| WO | 03080307 A2 | 10/2003 |
| WO | 2004089599 A1 | 10/2004 |
| WO | 2015101668 A1 | 7/2015 |
| WO | 2016163810 A1 | 10/2016 |

OTHER PUBLICATIONS

Zhang et al., "Using Screening Test Results to Predict the Effective Viscosity of Swollen Superabsorbent Polymer Particles Extrusion through an Open Fracture", Industrial & Engineering Chemistry Research, vol. 49, No. 23, Dec. 2010, pp. 12284-12293.

European Search Report for EP 18848934, dated Sep. 11, 2020, 5 pages.

Search Report dated Mar. 30, 2022 from the Office Action for Chinese Application No. 2018800547787 issued Apr. 12, 2022, 2 pgs.

Partial Supplementary European Search Report with Written Opinion for Application No. 18848934.8 dated Jun. 22, 2020, 14 pages.

\* cited by examiner

ASSESSMENT METHOD FOR INJECTION MOLDING PROPERTY OF PLASTIC FORM

CROSS-REFERENCE TO RELATED APPLICATIONS

The present application is a national phase entry under 35 U.S.C. § 371 of International Application No. PCT/KR2018/009609 filed Aug. 21, 2018, which claims priority from Korean Patent Application No. 10-2017-0106308 filed Aug. 22, 2017 and Korean Patent Application No. 10-2017-0122819 filed Sep. 22, 2017, all of which are incorporated herein by reference.

TECHNICAL FIELD

The present invention relates to a method for evaluating injection physical properties of a plastic resin, and a polyethylene resin suitable for an injection molding process. More particularly, the present invention relates to a novel method for evaluating injection physical properties of a plastic resin, which, when a particular plastic resin is processed by an injection process, can accurately derive injection suitability of the plastic resin and injection pressure in the injection process through a physical property value measured by using a resin specimen, and a polyethylene resin suitable for the injection molding process under specific conditions.

BACKGROUND ART

Plastic is a kind of a polymer compound that can be molded using heat and/or pressure, and is polymer that is easy to process, is melted when heat is applied, and returns to a solid state if a temperature is sufficiently lowered.

Since plastics are easy to process in various forms and a part of them can be recycled, various kinds of plastic resin molded products are being used in modern society.

In general, such plastic can be obtained by polymerizing monomer compounds, and the polymerized resin or resin composition may be processed and stored in the form of a pellet, and molded by various methods according to use, thus preparing products.

Injection molding is one of plastic molding techniques, in which a plastic resin prepared in the form of beads, pellets or chips is put into an injection molding machine and injected to be processed into a desired shape.

The injection molding machine comprises a hopper for injecting a plastic resin as a raw material, a heating unit for heating and melting the plastic resin, a screw for extruding the molten plastic resin, and a mold for molding it into a desired shape.

A plastic resin processed in the form of beads, pellets or chips is weighted by a fixed amount from the hopper and fed to the heating unit where it is melted while being pushed by the screw. The molten plastic resin is injected into the cavity of the mold from the injection nozzle. The plastic resin injected inside the mold is solidified again to have the final desired product form.

As the plastic resin is introduced into an injection mold in a conventional injection molding process, the material adjacent to the walls of the cavity inside the mold immediately begins to solidify, because the plastic resin in the fluid state cools to a temperature below the material's no-flow temperature.

As the plastic resin flows through the mold, a boundary layer of the resin is formed against the sides of the mold. As the plastic resin continues to be filled inside the mold, the boundary layer continues to thicken, eventually closing off the path of resin flow and preventing additional material from flowing into the mold. Therefore, it is necessary to judge the injection pressure at the time of injection and determine the suitability for the injection molding process.

That is, when the injection pressure is below a certain range, there is a problem that the plastic resin is not injected into the mold due to the above-mentioned cause. When the injection pressure is above a certain range, the processability may be deteriorated. In the past, there existed only a method of directly injecting a pellet-type plastic resin to confirm the injection pressure, and methods capable of predicting injection pressure before injection molding, or determining the suitability for injection molding have not been known.

DETAILED DESCRIPTION OF THE INVENTION

Technical Problem

An object of the present invention is intended to provide a novel method for evaluating injection physical properties of a plastic resin, which, when a particular plastic resin is processed by an injection process, can accurately determine injection suitability of the plastic resin through a physical property value measured by using a resin specimen, Another object of the present invention is intended to provide a polyethylene resin suitable for the injection molding process under specific conditions.

Technical Solution

In one aspect of the invention, there is provided a method for evaluating injection physical properties of a plastic resin including the steps of:
measuring a number average molecular weight value of a plastic resin specimen;
calculating a fraction of low molecular weight molecules having a molecular weight of 3,500 g/mol or less in the molecular weight distribution of the plastic resin specimen; and
predicting the injection suitability of the plastic resin through the number average molecular weight value and the fraction of the low molecular weight molecule.

In another aspect of the invention, there is provided a polyethylene resin for injection molding in which a number average molecular weight value is 14,500 g/mol or less; and a fraction of low molecular weight molecules having a molecular weight of 3,500 g/mol or less is 4% or more.

In other aspects of the invention, there is provided a method for evaluating injection physical properties of a plastic resin including the steps of:
measuring a melt index (MI) value of a plastic resin specimen;
measuring a steady flow viscosity value of the plastic resin specimen; and
deriving a shear thinning index value from the steady flow viscosity value according to a viscosity model equation; and
predicting injection pressure using the melt index value and the shear thinning index value.

Advantageous Effects

According to the present invention, even if the plastic resin is not injected into an actual injection molding process, it is possible to accurately derive the injection suitability and the injection pressure required for an actual injection process from only physical properties measured by a specimen, thus being economical in terms of time and money.

DETAILED DESCRIPTION OF THE EMBODIMENTS

The technical terms used herein is for the purpose of describing exemplary embodiments only and is not intended to limit the scope of the invention. The singular forms "a," "an" and "the" are intended to include plural forms, unless the context clearly indicates otherwise. It should be understood that the terms "comprise," "include", "have", etc. are used herein to specify the presence of stated features, integers, steps, components or combinations thereof, but do not preclude the presence or addition of one or more other features, integers, steps, components, or combinations thereof.

Since a variety of modification may be made to the present invention and there may be various forms of the invention, its specific examples are illustrated and will be described in detail below. However, it should be understood that these are not intended to limit the present invention to specific disclosure, and that the present invention includes all the modifications, equivalents or replacements thereof without departing from the spirit and technical scope of the invention.

Throughout the present specification, the term "plastic resin" is a concept that includes both thermosetting plastic and thermoplastic plastic, and means a polymeric plastic resin which can be processed by an injection molding method.

Hereinafter, embodiments of the present invention will be described in detail.

The method for evaluating injection physical properties of a plastic resin according to one embodiment of the invention includes the steps of:
measuring a number average molecular weight value of a plastic resin specimen;
calculating a fraction of low molecular weight molecules having a molecular weight of 3,500 g/mol or less in the molecular weight distribution of the plastic resin specimen; and
predicting the injection suitability of the plastic resin through the number average molecular weight value and the fraction of the low molecular weight molecule.

The present inventors have found that, after making a hypothesis that in an injection molding process of a plastic resin, the injection pressure is related to the molecular weight characteristics of the corresponding plastic resin, it is possible to accurately derive the actual injection suitability through specific molecular weight-related factors that can be measured using plastic resin specimens, thereby completing the present invention.

According to an embodiment of the invention, a number average molecular weight of the plastic resin specimen may be preferably about 10,000 to about 20,000 g/mol.

And, the fraction of the low molecular weight molecules having a molecular weight of 3,500 g/mol or less may be preferably about 1 to about 10%.

Further, the plastic resin may have an injection pressure of less than about 1600 Pa, preferably about 1000 to about 1600 Pa, or about 1200 Pa or more and less than about 1600 Pa under the injection process conditions of about 240° C. and about 650 bar.

According to another embodiment of the invention, predicting the injection suitability may be determining that it is suitable for injection when the number average molecular weight of the plastic resin specimen is 14,500 g/mol or less and the fraction of the low molecular weight molecules having a molecular weight of 3,500 g/mol or less is 4% or more.

If the injection pressure is below a certain range, there is a problem that the plastic resin is not injected into the mold, and if the injection pressure is above a certain range, the processability may be deteriorated. Therefore, in a general plastic resin injection process, it is desirable to adjust the injection pressure to less than about 1600 Pa under the injection process conditions of about 240° C. and about 650 bar.

Such injection pressure is a characteristic that can vary depending on the rheological properties of the plastic resin. When the number average molecular weight is 14,500 g/mol or less and the fraction of low molecular weight molecules having a molecular weight of 3,500 g/mol or less is 4% or more, it has been found that under the injection process conditions of about 240° C. and about 650 bar, the injection pressure is less than about 1600 Pa, or about 1200 Pa or more and less than about 1600 Pa and the injection suitability is very excellent. If any one of the above conditions is not satisfied, it has been found that under the injection process conditions of about 240° C. and about 650 bar, the injection pressure exceeds about 1600 Pa and the injection suitability is lowered.

That is, when the above-mentioned method is used, it is possible to measure only the molecular weight characteristics of the specimen without directly injecting the plastic resin into the injection process, thereby easily determining the injection suitability under specific conditions therefrom.

Meanwhile, according to still another embodiment of the invention, there is provided a polyethylene resin for injection molding in which a number average molecular weight value is 14,500 g/mol or less; and a fraction of low molecular weight molecules having a molecular weight of 3,500 g/mol or less is 4% or more.

The polyethylene resin is very suitable for an injection molding process because the injection pressure is less than about 1600 Pa under the injection process conditions of about 240° C. and about 650 bar as described above.

The polyethylene resin may have a melt index (MI) value of about 0.1 to about 1.5 g/10 min as measured at 190° C. under a load of 2.16 kg according to ASTM 1238. The density value of the plastic resin as measured according to ASTM 1505 may be about 0.94 to about 0.96 g/cm³.

The above-mentioned polyethylene resin can be produced by using the following metallocene catalyst.

The metallocene catalyst that can be used includes a mixture of one or more first metallocene compounds represented by the following Chemical Formula 1; and one or more second metallocene compounds represented by the following Chemical Formula 3.

[Chemical Formula 1]

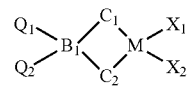

in Chemical Formula 1,
M is a Group 4 transition metal;
$B_1$ is carbon, silicon or germanium;

$Q_1$ and $Q_2$ are the same as or different from each other, and are each independently hydrogen, a halogen, a C1-C20 alkyl group, a C2-C20 alkenyl group, a C6-C20 aryl group, a C7-C20 alkylaryl group, a C7-C20 arylalkyl group, a C1-C20 alkoxy group, a C2-C20 alkoxyalkyl group, a C3-C20 heterocycloalkyl group, or a C5-C20 heteroaryl group;

$X_1$ and $X_2$ are the same as or different from each other, and are each independently a halogen, a C1-C20 alkyl group, a C2-C20 alkenyl group, a C6-C20 aryl group, a nitro group, an amido group, a C1-C20 alkylsilyl group, a C1-C20 alkoxy group, or a C1-C20 sulfonate group;

$C_1$ and $C_2$ are the same as or different and are each independently represented by one of the following Chemical Formula 2a, Chemical Formula 2b, Chemical Formula 2c, or Chemical Formula 2d, with the proviso that at least one of $C_1$ and $C_2$ is represented by Chemical Formula 2a;

[Chemical Formula 2a]

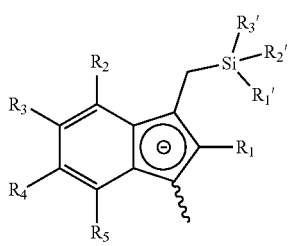

[Chemical Formula 2b]

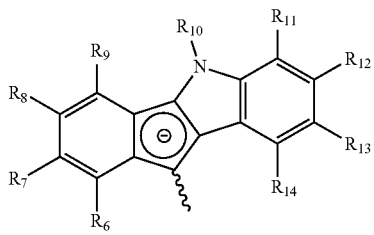

[Chemical Formula 2c]

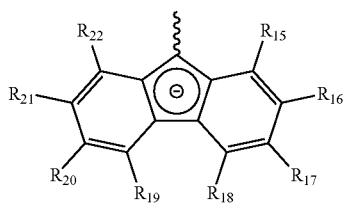

[Chemical Formula 2d]

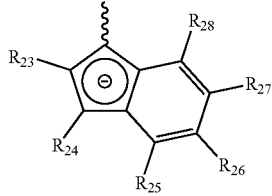

in Chemical Formulas 2a, 2b, 2c and 2d, $R_1$ to $R_{28}$ are the same as or different from each other, and are each independently hydrogen, a halogen, a C1-C20 alkyl group, a C2-C20 alkenyl group, a C1-C20 alkylsilyl group, a C1-C20 silylalkyl group, a C1-C20 alkoxysilyl group, a C1-C20 ether group, a C1-C20 silyl ether group, a C1-C20 alkoxy group, a C6-C20 aryl group, a C7-C20 alkylaryl group, or a C7-C20 arylalkyl group, $R'_1$ to $R'_3$ are the same as or different from each other, and are each independently hydrogen, a halogen, a C1-C20 alkyl group, a C2-C20 alkenyl group, or a C6-C20 aryl group, and two or more adjacent groups of $R_1$ to $R_{28}$ may be connected to each other to form a substituted or unsubstituted aliphatic or aromatic ring.

[Chemical Formula 3]

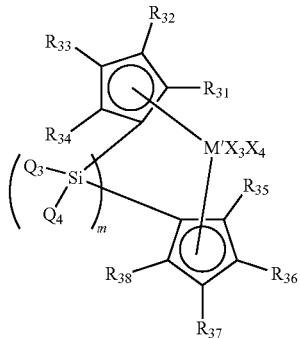

in Chemical Formula 3, at least one of $R_{31}$ to $R_{38}$ is —$(CH_2)$n-OR (where R is a linear or branched C1-C6 alkyl group, and n is an integer of 2 to 4), the rest are the same as or different from each other and are independently a functional group selected from the group consisting of hydrogen, a C1-C20 alkyl group, a C2-C20 alkenyl group, a C6-C20 aryl group, a C7-C20 alkylaryl group, and a C7-C20 arylalkyl group, or two or more adjacent groups may be connected to each other to form an aliphatic or aromatic ring which is substituted or unsubstituted by a C1-C10 hydrocarbyl group, $Q_3$ and $Q_4$ are the same as or different from each other and are each independently a halogen or a C1-C20 alkyl group;

M' is a Group 4 transition metal, $X_3$ and $X_4$ are the same as or different from each other and are each independently a halogen or a C1-C20 alkyl group, and m is an integer of 0 or 1.

The respective substituents in Chemical Formulas above will be described in more detail as follows.

The C1-C20 alkyl may include a linear or branched alkyl, and specific examples thereof include, but not limited to, methyl, ethyl, propyl, isopropyl, n-butyl, tert-butyl, pentyl, hexyl, heptyl, octyl, and the like.

The C2-C20 alkenyl may include a linear or branched alkenyl, and specific examples thereof include, but not limited to, allyl, ethenyl, propenyl, butenyl, pentenyl, and the like.

The C6-C20 aryl may include a monocyclic or condensed cyclic aryl, and specific examples thereof include, but not limited to, phenyl, biphenyl, naphthyl, phenanthrenyl, fluorenyl, and the like.

The C5-C20 heteroaryl may include a monocyclic or condensed cyclic heteroaryl, and specific examples thereof include, but not limited to, carbozolyl, pyridyl, quinoline, isoquinoline, thiophenyl, furanyl, imidazole, oxazolyl, thiazolyl, triazine, tetrahydropyranyl, tetrahydrofuranyl, and the like.

The C1-C20 alkoxy may include, but not limited to, methoxy, ethoxy, phenyloxy, cyclohexyloxy, and the like.

The C1-C20 alkylsilyl group may include, but not limited to, a methylsilyl group, a dimethylsilyl group, a trimethylsilyl group, and the like.

The C1-C20 silylalkyl group may include, but not limited to, a silylmethyl group, a dimethylsilylmethyl group (—CH$_2$—Si(CH$_3$)$_2$H), a trimethylsilylmethyl group (—CH$_2$—Si(CH$_3$)$_3$), and the like.

The Group 4 transition metal may include, but not limited to, titanium, zirconium, hafnium, and the like.

In the metallocene compound of Chemical Formula 1, preferably, R$_1$ to R$_{28}$ in Chemical Formulas 2a, 2b, 2c and 2d are each independently hydrogen, a halogen, a methyl group, an ethyl group, a propyl group, an isopropyl group, an n-butyl group, a tert-butyl group, a pentyl group, a hexyl group, a heptyl group, an octyl group, an ethylene group, a propylene group, a butylene group, a phenyl group, a benzyl group, a naphthyl group, a halogen group, an ether group, a trimethylsilyl group, a triethylsilyl group, a tripropylsilyl group, a tributylsilyl group, a triisopropylsilyl group, a trimethylsilylmethyl group, a dimethyl ether group, a tert-butyldimethylsilyl ether group, a methoxy group, an ethoxy group, or a tert-butoxyhexyl group, but are not limited thereto.

Q$_1$ to Q$_2$ in Chemical Formula 1 are hydrogen, a methyl group, an ethyl group, a propyl group, an isopropyl group, an n-butyl group, a tert-butyl group, a methoxymethyl group, a tert-butoxymethyl group, a 1-ethoxyethyl group, a 1-methyl-1-methoxyethyl group, a tert-butoxyhexyl group, a tetrahydropyranyl group, or a tetrahydrofuranyl group, but are not limited thereto.

The B$_1$ in Chemical Formula 1 is preferably silicon (Si), but is not limited thereto.

In particular, the metallocene compound of Chemical Formula 1 has a feature that the substituent of Chemical Formula 2a contains at least one or more of C1-C20 silylalkyl group such as a trimethylsilyl methyl group.

More specifically, the indene derivative of Chemical Formula 2a has a relatively low electron density as compared with an indenoindole derivative or a fluorenyl derivative, and includes a silylalkyl group having a large steric hindrance, due to the steric hindrance effect and the electron density factor, the olefin polymer having a relatively low molecular weight as compared with the metallocene compound having a similar structure can be polymerized with high activity.

In addition, an indenoindole derivative which can be represented by Chemical Formula 2b, a fluorenyl derivative which can be represented by Chemical Formula 2c, and an indene derivative which can be represented by Chemical Formula 2d form a crosslinked structure via a bridge, and have an unshared electron pair capable of acting as a Lewis base in the ligand structure, thereby exhibiting a high polymerization activity.

According to one embodiment of the invention, specific examples of the functional group represented by Chemical Formula 2a may include a compound represented by one of the following structural formulas, but the present invention is not limited thereto.

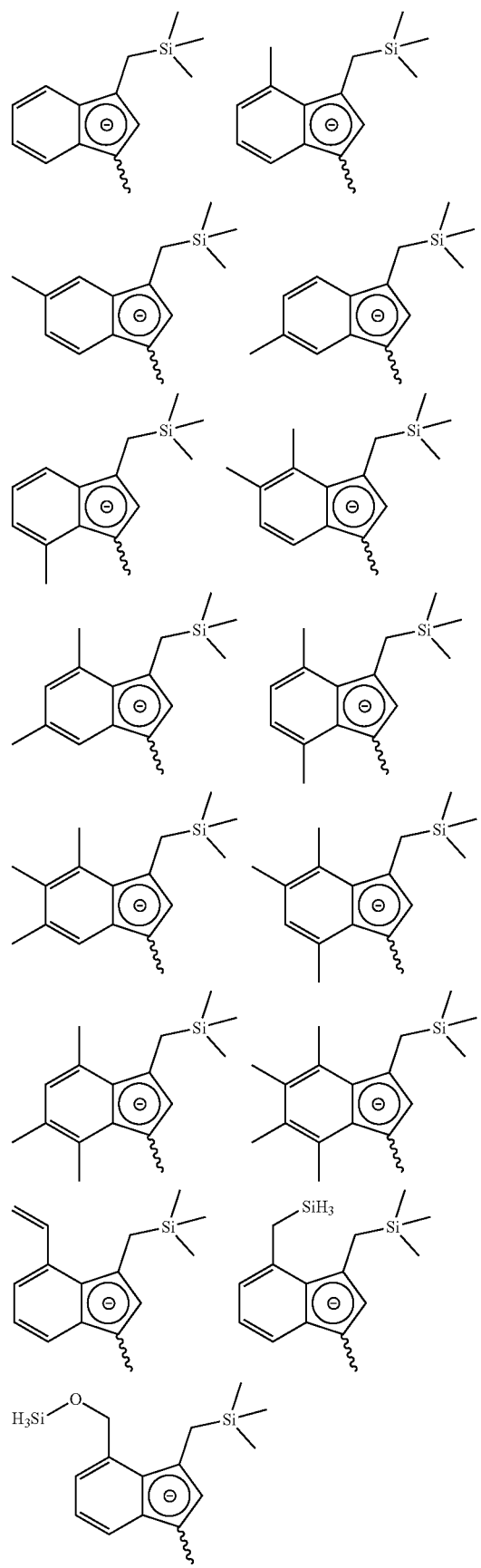

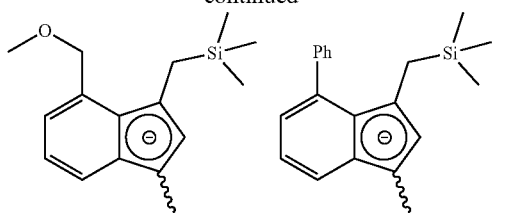
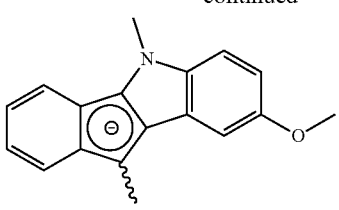
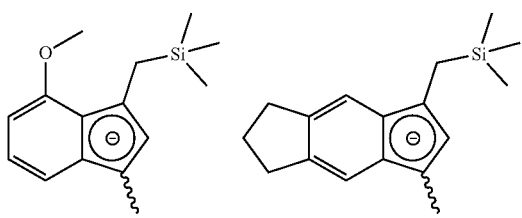
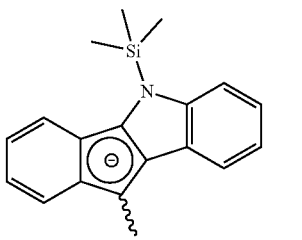
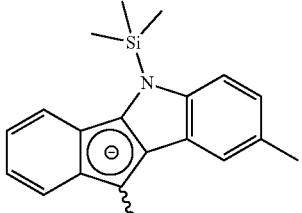
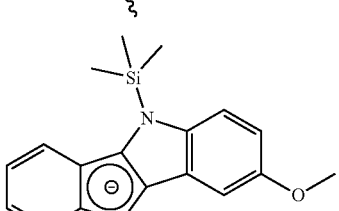
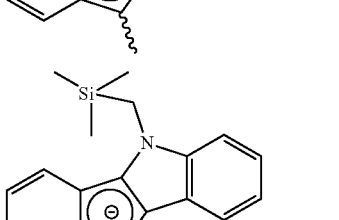
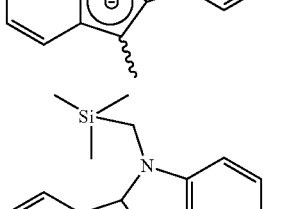
According to one embodiment of the invention, specific examples of the functional group represented by Chemical Formula 2b may include a compound represented by one of the following structural formulas, but the present invention is not limited thereto.
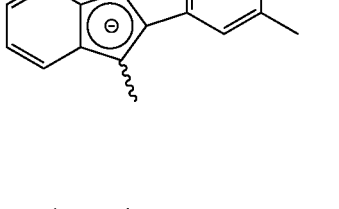
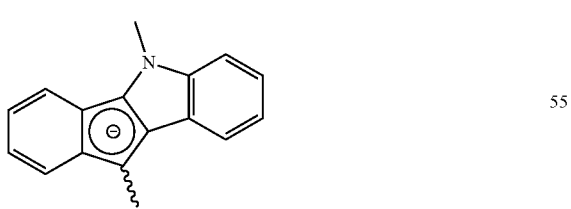
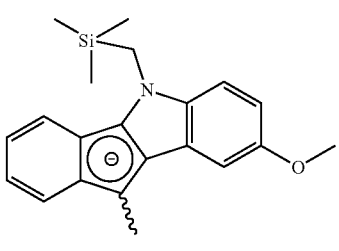
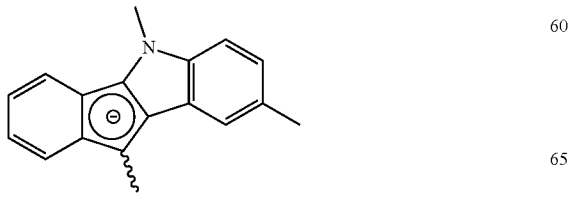

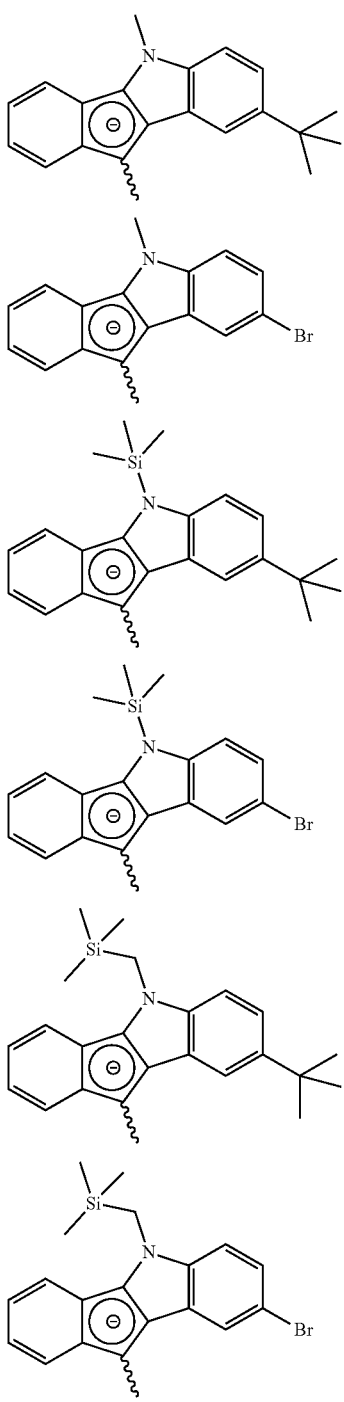
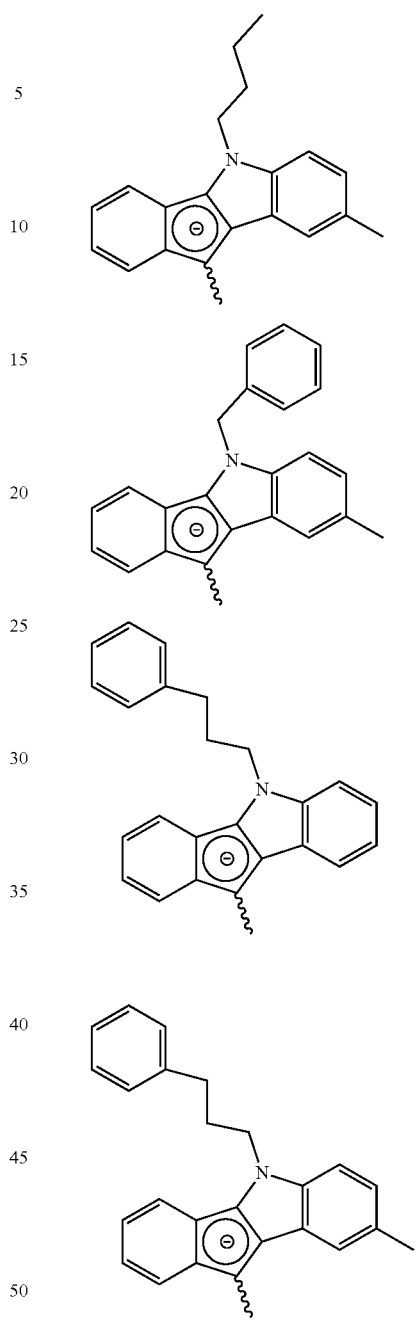
According to one embodiment of the invention, specific examples of the functional group represented by Chemical Formula 2c may include a compound represented by one of the following structural formulas, but the present invention is not limited thereto.
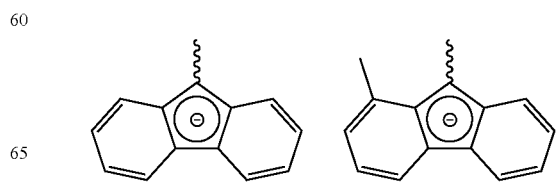

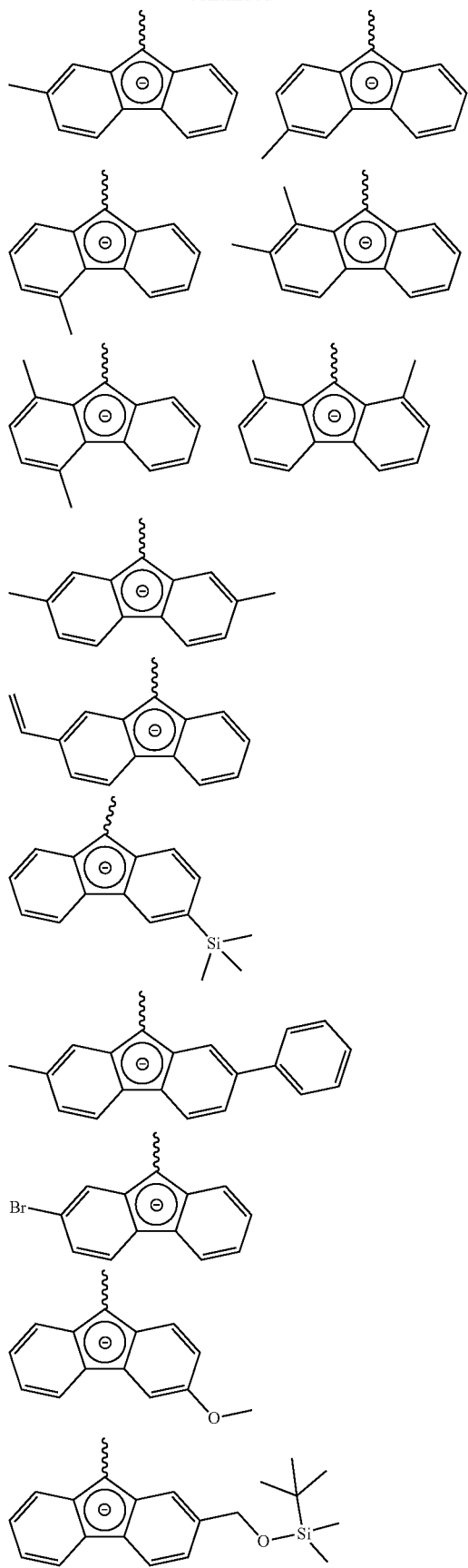
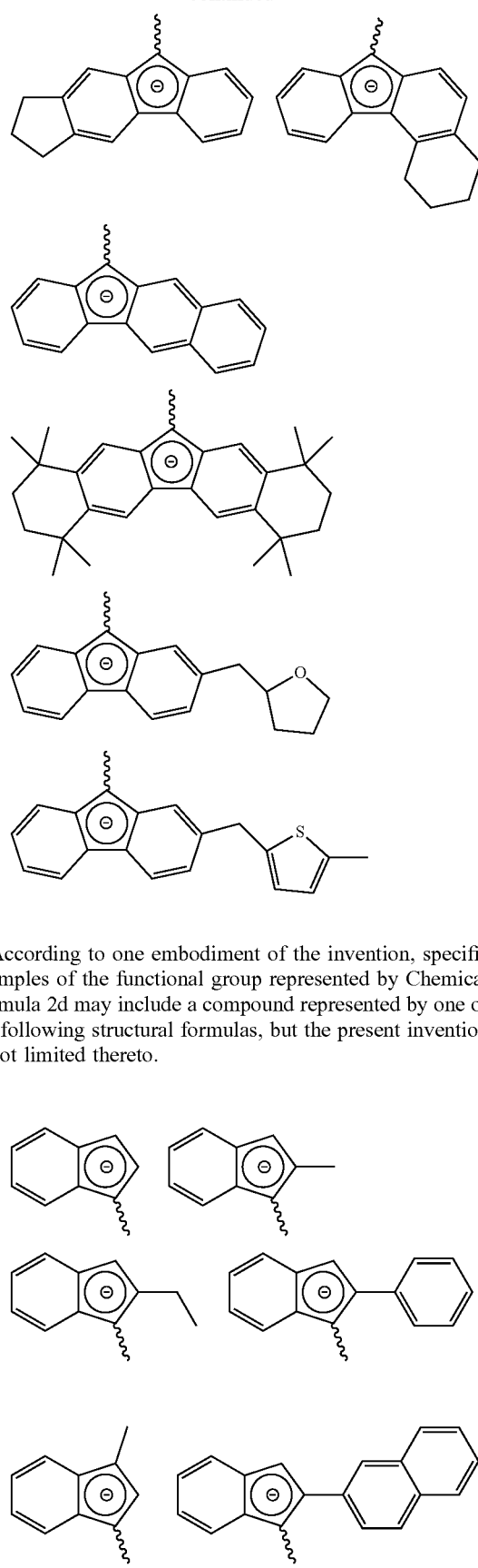
According to one embodiment of the invention, specific examples of the functional group represented by Chemical Formula 2d may include a compound represented by one of the following structural formulas, but the present invention is not limited thereto.

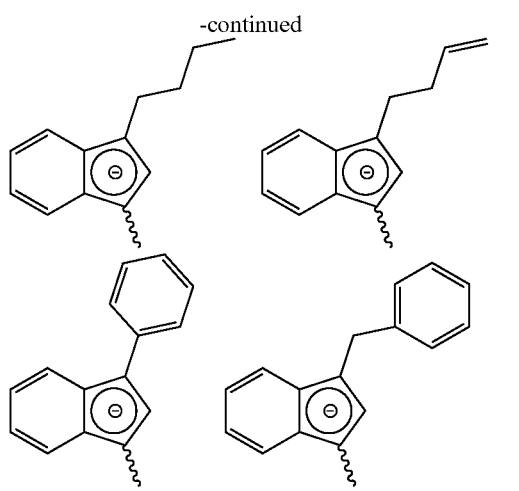
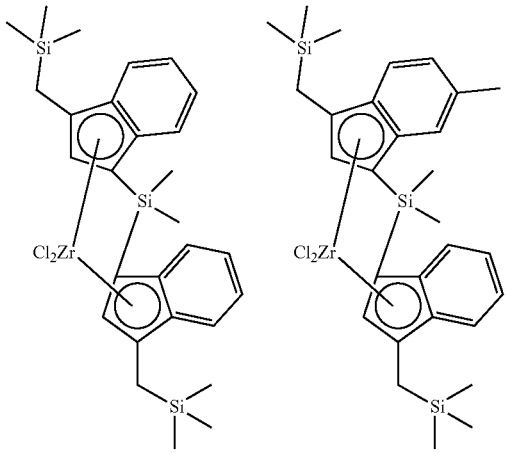
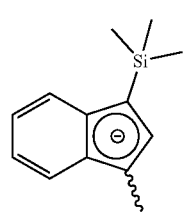
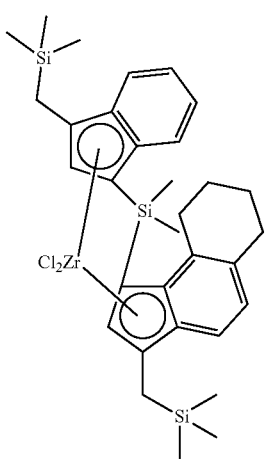
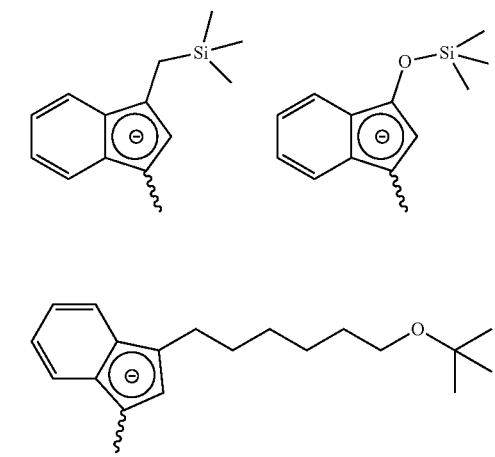
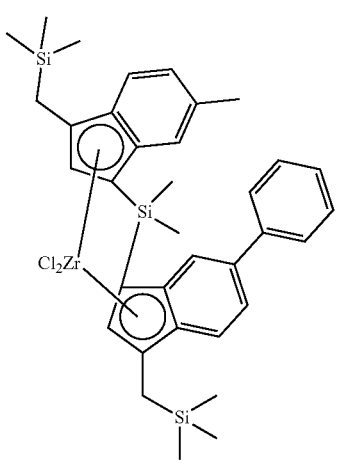
According to one embodiment of the invention, specific examples of the metallocene compound represented by Chemical Formula 1 may include a compound represented by one of the following structural formulas, but the present invention is not limited thereto.

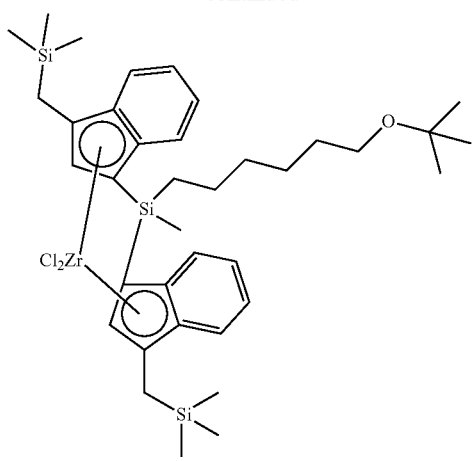
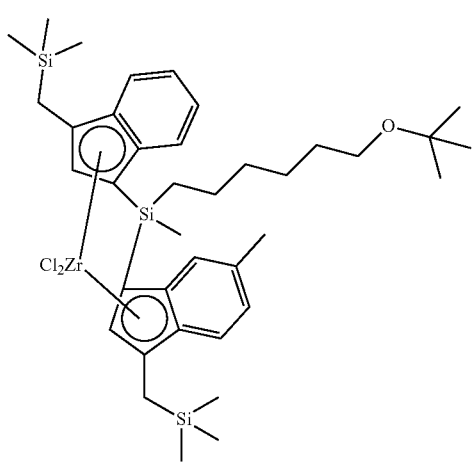
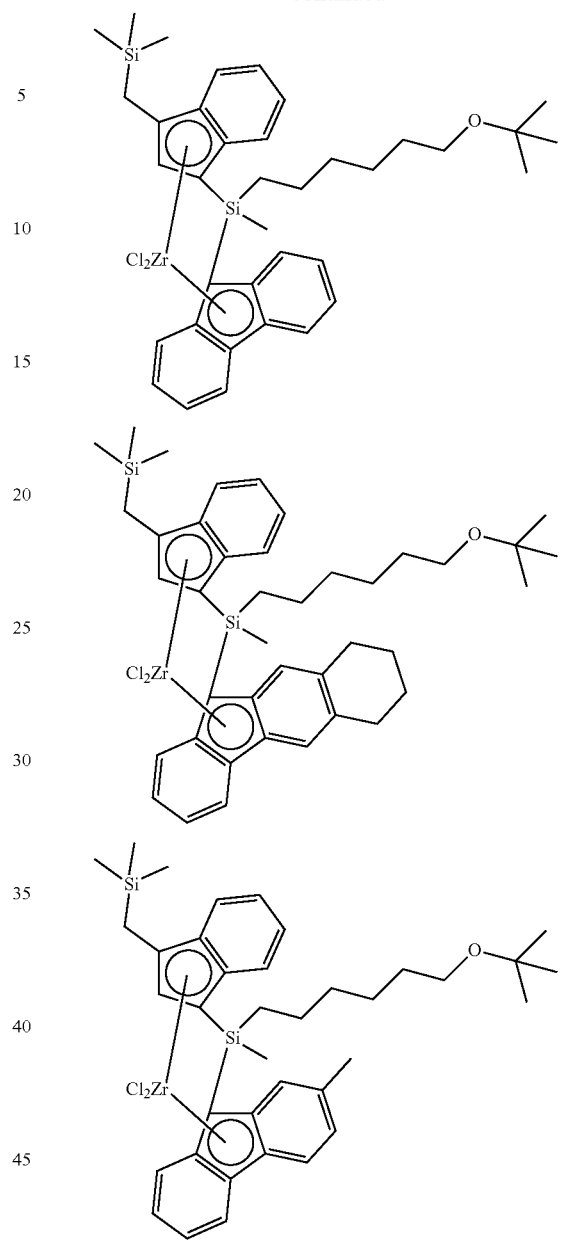

-continued

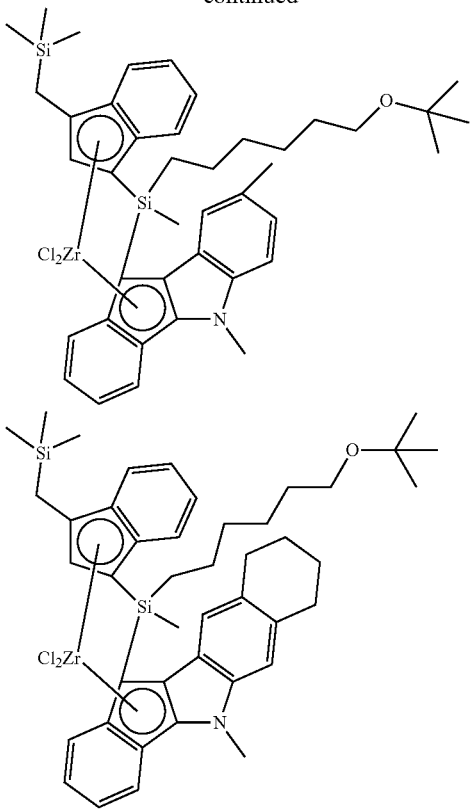

The first metallocene compound of Chemical Formula 1 is superior in activity and can polymerize a polyethylene having high molecular weight. In particular, even when it is supported on a support, it can exhibit high polymerization activity and therefore, it is possible to prepare a polyethylene of high molecular weight.

According to one embodiment, the metallocene compound of Chemical Formula 1 may be obtained by connecting an indene derivative and a cyclopentadiene derivative with a bridge compound to prepare a ligand compound, and then putting a metal precursor compound therein to carry out a metallation, but is not limited thereto.

The second metallocene compound included in the hybrid metallocene catalyst may be represented by the following Chemical Formula 3.

[Chemical Formula 3]

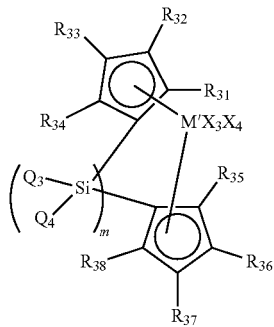

in Chemical Formula 3,
at least one of $R_{31}$ to $R_{38}$ is —$(CH_2)_n$—OR (where R is a linear or branched C1-C6 alkyl group, and n is an integer of 2 to 4), the rest are the same as or different from each other, and are each independently a functional group selected from the group consisting of hydrogen, a C1-C20 alkyl group, a C2-C20 alkenyl group, a C6-C20 aryl group, a C7-C20 alkylaryl group, and a C7-C20 arylalkyl group, or two or more adjacent groups may be connected to each other to form an aliphatic or aromatic ring which is substituted or unsubstituted with a C1-C10 hydrocarbyl group, $Q_3$ and $Q_4$ are the same as or different from each other, and are each independently a halogen or a C1-C20 alkyl group;

M' is a Group 4 transition metal, $X_3$ and $X_4$ are the same as or different from each other, and are each independently a halogen or a C1-C20 alkyl group, and m is an integer of 0 or 1.

In the metallocene compound of Chemical Formula 3, as a substituent of —$(CH_2)_n$—OR (where R is a linear branched C1-C6 alkyl group and n is an integer of 2 to 4) is introduced into a substituent of cyclopentadiene (Cp) or a derivative thereof, during the production of polyethylene using comonomers, it exhibits a lower conversion to a comonomer than other Cp-based catalyst that does not contain the substituent, and thus can prepare the medium or low molecular weight polyethylene having controlled copolymerization degree or comonomer distribution.

As a more specific example, when the second metallocene compound of Chemical Formula 3 is used together with other metallocene compounds for producing a polyethylene having a high molecular weight region as a hybrid catalyst, the polyethylene in the high molecular weight region can exhibit high copolymerizability due to the other metallocene compound, while the polyethylene in the low molecular weight region can exhibit low copolymerizability due to the function of the second metallocene compound of Chemical Formula 3. Thus, it is very advantageous to polymerize a polyethylene having a BOCD (Broad Orthogonal Co-monomer Distribution) structure, which is a structure in which the content of the comonomer is concentrated on the high molecular weight main chain, that is, a structure in which side branch content increases toward a higher molecular weight side.

The respective substituents defined by Chemical Formula 3 will be described in more detail as follows.

The C1-C20 alkyl group may include a linear or branched alkyl group.

The aryl group is preferably a C6-C20 aromatic ring, and specific examples thereof include, but not limited thereto, phenyl, naphthyl, anthracenyl, pyridyl, dimethylanilinyl, and anisole.

The alkylaryl group means an aryl group into which one or more linear or branched C1-C20 alkyl groups are introduced, and the arylalkyl group means a linear or branched alkyl group into which one or more C6-C20 aryl groups are introduced.

The hydrocarbyl group means a monovalent hydrocarbon compound, and examples thereof include an alkyl group, an alkenyl group, an aryl group, an alkylaryl group, an arylalkyl group and the like.

The halogen group means fluorine (F), chlorine (Cl), bromine (Br) and iodine (I).

The Group 4 transition metal defined as M' may be Ti (titanium), Zr (zirconium), hafnium (Hf) or the like, but is not limited thereto.

The $Q_3$ and $Q_4$ may be preferably a C1-C20 alkyl group, more preferably a methyl group, an ethyl group, or a propyl group.

The $X_3$ and $X_4$ may be preferably a halogen group, more preferably Cl.

The metallocene compound of one embodiment of the invention has a feature that any one or more of $R_{31}$ to $R_{38}$ in Chemical Formula 3 is —$(CH_2)$n-OR (where R is a linear or branched C1-C6 alkyl group, and n is an integer of 2 to 4). In Chemical Formula 3, —$(CH_2)$n-OR may be preferably a tert-butoxybutyl group. More preferably, two cyclopentadiene (Cp) derivatives each comprise a —$(CH_2)$n-OR group, or only any one Cp derivative may contain a —$(CH_2)$n-OR group, and the —$(CH_2)$n-OR group may be a tert-butoxybutyl group.

When the metallocene compound having such a structure is supported on a support, the —$(CH_2)$n-OR group in the substituent can form a covalent bond through a close interaction with a silanol group on the surface of the silica used as the support, and thus stable support polymerization is possible.

The metallocene compound of Chemical Formula 3 may be represented more specifically by the following Chemical Formulas 3-1 to 3-4.

[Chemical Formula 3-1]

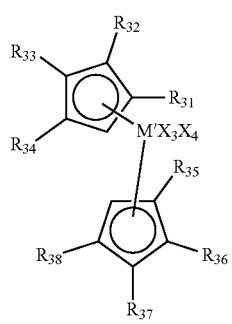

[Chemical Formula 3-2]

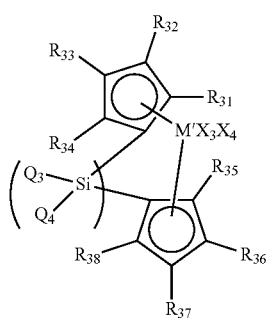

[Chemical Formula 3-3]

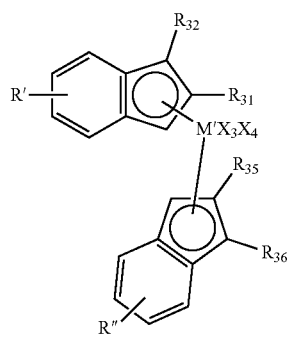

[Chemical Formula 3-4]

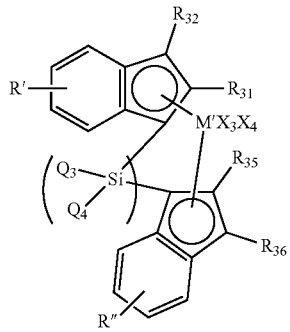

in Chemical Formulas 3-1 to 3-4, $R_{31}$ to $R_{38}$, $Q_3$ to $Q_4$, M', and $X_3$ to $X_4$ are the same as defined in Chemical Formula 3, R' and R" are the same as or different from each other, and are each independently a C1-C10 hydrocarbyl group.

The structure of Chemical Formula 3-1 is a case where m is 0 in Chemical Formula 3, which is a structure in which two cyclopentadiene (Cp) groups are non-crosslinked, and any one or more substituents of $R_{31}$ to $R_{38}$ are —$(CH_2)$n-OR.

The structure of Chemical Formula 3-2 is a case where m is 1 in Chemical Formula 3, which is a structure in which two Cp groups are crosslinked by a $SiQ_3Q_4$ bridge, and any one or more substituents of $R_{31}$ to $R_{38}$ is —$(CH_2)$n-OR.

The structure of Chemical Formula 3-3 is a case where m is 0 in Chemical Formula 3, which is a structure in which two indene groups formed by connecting adjacent substituents in the Cp group together are non-crosslinked. Any one or more substituents in the substituents $R_{31}$, $R_{32}$, $R_{35}$, and $R_{36}$ of the indene group are —$(CH_2)$n-OR, and each indene group may be substituted with a C1-C10 hydrocarbyl group (R', R").

The structure of Chemical Formula 3-4 is a case where m is 1 in Chemical Formula 3, which is a structure in which two indene groups formed by connecting adjacent substituents in the Cp group together are crosslinked by $SiQ_3Q_4$ bridge, wherein any one or more substituents in the substituents $R_{31}$, $R_{32}$, $R_{35}$, and $R_{36}$ of the indene group are —$(CH_2)$n-OR, and each indene group may be substituted with a C1-C10 hydrocarbyl group (R', R").

Meanwhile, specific examples of the metallocene compound represented by Chemical Formula 3 include compounds represented by the following structural formulas, but the present invention is not limited thereto.

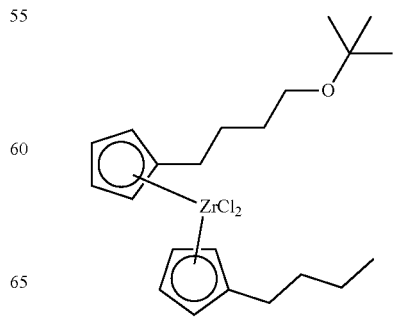

-continued

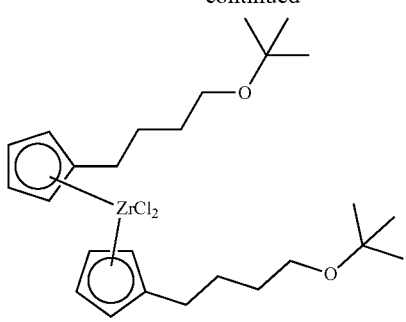
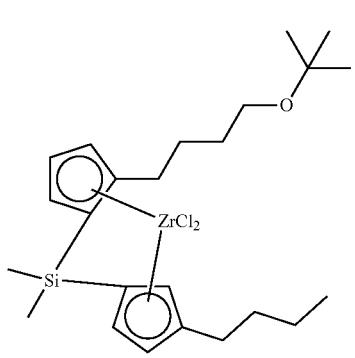
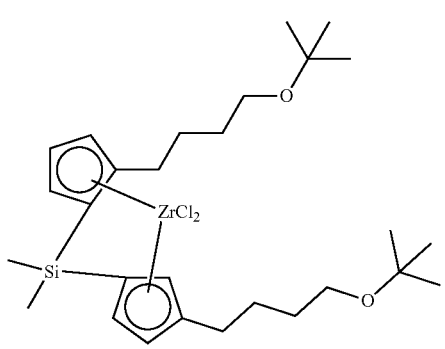
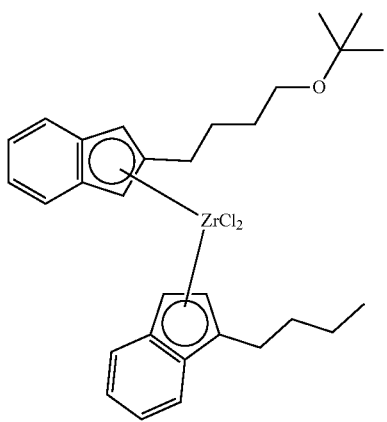

-continued

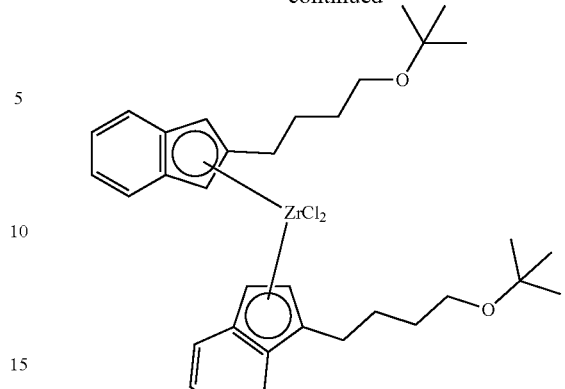

The metallocene compound represented by Chemical Formula 3 may be prepared in accordance with a known method for preparing an organic compound or a transition metal compound.

The metallocene catalyst used in one embodiment of the invention may be a hybrid supported catalyst in which at least one of the first metallocene compound represented by Chemical Formula 1 and at least one of the second metallocene compound selected among the compounds represented by Chemical Formula 3 are supported on a support together with a cocatalyst compound.

In the hybrid supported metallocene catalyst according to one embodiment of the invention, the cocatalyst to be supported on the support for activation of the metallocene compound is an organometallic compound containing a Group 13 metal, and it is not particularly limited as long as it can be used when polymerizing the olefin in the presence of a general metallocene catalyst.

Specifically, the cocatalyst compound may include at least one of an aluminum-containing first cocatalyst of the following Chemical Formula 4 and a borate-based second cocatalyst of the following Chemical Formula 5.

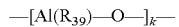  [Chemical Formula 4]

in Chemical Formula 4, each $R_{39}$ is independently a halogen, a halogen-substituted or unsubstituted C1-C20 hydrocarbyl group, and k is an integer of 2 or more,

  [Chemical Formula 5]

in Chemical Formula 5, $T^+$ is a +1 valent polyatomic ion, B is boron in an oxidation state of +3, and each G is independently selected from the group consisting of hydride, dialkylamido, halide, alkoxide, aryloxide, hydrocarbyl, halocarbyl and halo-substituted hydrocarbyl, wherein the G has 20 or less carbon atoms, with the proviso that G is halide at one or less position.

By using the first and the second cocatalysts as above, the polyethylene finally prepared may have more uniform molecular weight distribution, while the polymerization activity can be enhanced.

The first cocatalyst of Chemical Formula 4 may be an alkylaluminoxane-based compound wherein the repeating units are combined into a linear, circular or network form. Specific examples of the first cocatalyst include methylaluminoxane (MAO), ethylaluminoxane, isobutylaluminoxane, butylaluminoxane, and the like.

Further, the second cocatalyst of Chemical Formula 5 may be a trisubstituted ammonium salt, or a dialkylammonium salt, or a trisubstituted phosphate type borate compound. Specific examples of the second cocatalyst include a borate-based compound in the form of a trisubstituted ammonium salt, such as trimethylammonium tetraphenylborate, methyl dioctadecylammonium tetraphenylborate, triethylammonium tetraphenylborate, tripropylammonium tetraphenylborate, tri(n-butyl)ammonium tetraphenylborate, methyltetradecyloctadecylammonium tetraphenylborate, N,N-dimethylanilinium tetraphenylborate, N,N-diethylanilinium tetraphenylborate, N,N-dimethyl(2,4,6-trimethylanilinium)tetraphenylborate, trimethylammonium tetrakis(pentafluorophenyl)borate, methylditetradecylammonium tetrakis(pentaphenyl)borate, methyldioctadecylammonium tetrakis(pentafluorophenyl)borate, triethylammonium, tetrakis(pentafluorophenyl)borate, tripropylammonium tetrakis(pentafluorophenyl)borate, tri(n-butyl)ammonium tetrakis(pentafluorophenyl)borate, tri(sec-butyl)ammonium tetrakis(pentafluorophenyl)borate, N,N-dimethylanilinium tetrakis(pentafluorophenyl)borate, N,N-diethylanilinium tetrakis(pentafluorophenyl)borate, N,N-dimethyl (2,4,6-trimethylanilinium)tetrakis(pentafluorophenyl)borate, trimethylammonium tetrakis(2,3,4,6-tetrafluorophenyl)borate, triethylammonium tetrakis(2,3,4,6-tetrafluorophenyl)borate, tripropylammonium tetrakis(2,3,4,6-tetrafluorophenyl)borate, tri(n-butyl)ammonium tetrakis(2,3,4,6-tetrafluorophenyl)borate, dimethyl(t-butyl)ammonium tetrakis(2,3,4,6-tetrafluorophenyl)borate, N,N-dimethylanilinium tetrakis(2,3,4,6-tetrafluorophenyl)borate, N,N-diethylanilinium tetrakis(2,3,4,6-tetrafluorophenyl)borate or N,N-dimethyl-(2,4,6-trimethylanilinium)tetrakis-(2,3,4,6-tetrafluorophenyl)borate and the like; a borate-based compound in the form of a dialkylammonium salt, such as dioctadecylammonium tetrakis(pentafluorophenyl)borate, ditetradecylammonium tetrakis(pentafluorophenyl) borate or dicyclohexylammonium tetrakis(pentafluorophenyl)borate; or a borate-based compound in the form of a trisubstituted phosphonium salt, such as triphenylphosphonium tetrakis(pentafluorophenyl)borate, methyldioctadecylphosphonium tetrakis(pentafluorophenyl)borate or tri(2,6-dimethylphenyl)phosphonium tetrakis(pentafluorophenyl)borate.

In the hybrid supported metallocene catalyst according to one embodiment of the invention, the mass ratio between the whole transition metals contained in the first metallocene compound represented by the Chemical Formula 1 or the second metallocene compound represented by the Chemical Formula 3 and the support may be 1:10 to 1:1000. When the support and the metallocene compound are contained in the range of the above mass ratio, it is possible to exhibit an optimal shape. Further, the mass ratio of the cocatalyst compound to the support may be 1:1 to 1:100.

In the supported metallocene catalyst according to one embodiment of the invention, as the support, a support containing a hydroxy group on its surface can be used, and preferably a support having highly reactive hydroxy group and siloxane group, of which the surface is dried and removed of moisture can be used.

For example, silica, silica-alumina, silica-magnesia or the like, which are dried at high temperature, can be used, and they may typically contain oxides, carbonates, sulfates, and nitrates such as $Na_2O$, $K_2CO_3$, $BaSO_4$, and $Mg(NO_3)_2$.

The drying temperature of the support is preferably 200 to 800° C., more preferably 300 to 600° C., and most preferably 300 to 400° C. If the drying temperature of the support is lower than 200° C., it retains moisture too much so that moisture on the surface is reacted with the cocatalyst. If the drying temperature is higher than 800° C., pores on the surface of the support are combined with each other to reduce surface area, and many hydroxyl groups are lost on the surface to remain only siloxane groups. Thus, since the reactive sites with cocatalyst are reduced, it is not preferable.

The amount of hydroxyl group on the surface of the support is preferably 0.1 to 10 mmol/g, and more preferably 0.5 to 5 mmol/g. The amount of hydroxyl group on the surface of the support may be controlled depending on the preparation method and conditions of the support, or drying conditions such as temperature, time, vacuum, spray drying, and the like.

If the amount of hydroxyl group is less than 0.1 mmol/g, the reactive sites with cocatalyst are reduced. If the amount of hydroxyl group is more than mmol/g, it is not desirable because it may be caused by moisture besides the hydroxyl groups present on the surface of support particles.

Meanwhile, the polyethylene according to one embodiment of the invention can be produced by polymerizing ethylene in the presence of the hybrid supported metallocene catalyst described above.

The polymerization reaction may be carried out by polymerizing ethylene using a continuous slurry polymerization reactor, a loop slurry reactor, a gas phase reactor, or a solution reactor.

In this case, according to one embodiment of the invention, the polymerization can be carried out by supplying ethylene in a single reactor optionally containing a molecular weight regulator.

In addition, according to one embodiment of the invention, the polymerization may be carried out by supplying an ethylene monomer in the presence of hydrogen gas.

At this time, the hydrogen gas acts to suppress an abrupt reaction of the metallocene catalyst at the initial stage of polymerization, so that a high molecular weight polyethylene can be produced in a larger amount. Therefore, by adjusting the use of the hydrogen gas and the used amount thereof, the polyethylene according to one embodiment of the invention can be effectively obtained.

The hydrogen gas may be introduced in an amount of 0.01% to 1% by weight based on the weight of the ethylene monomer. When the amount of hydrogen gas used becomes excessively small, the catalytic activity is not sufficiently realized and so it may become difficult to produce a polyethylene having desired physical properties. When hydrogen gas is introduced in an excessively large amount, the activity of the catalyst may not be fully realized.

Meanwhile, an organoaluminum compound for removing moisture in a reactor is further introduced in the reactor, and the polymerization reaction can proceed in the presence thereof. Specific examples of such organoaluminum compounds include trialkylaluminum, dialkylaluminum halide, alkyl aluminum dihalide, aluminum dialkyl hydride, alkyl aluminum sesquihalide, or the like, and more specific examples thereof include $Al(C_2H_5)_3$, $Al(C_2H_5)_2H$, $Al(C_3H_7)_3$, $Al(C_3H_7)_2H$, $Al(i-C_4H_9)_2H$, $Al(C_8H_{17})_3$, $Al(C_{12}H_{25})_3$, $Al(C_2H_5)(C_{12}H_{25})_2$, $Al(i-C_4H_9)(C_{12}H_{25})_2$, $Al(i-C_4H_9)_2H$, $Al(i-C_4H_9)_3$, $(C_2H_5)_2AlCl$, $(i-C_3H_9)_2AlCl$, $(C_2H_5)_3Al_2Cl_3$ or the like. Such organoaluminum compounds can be continuously introduced into the reactor, and may be introduced at a rate of about 0.1 to 10 moles per kg of the reaction medium introduced into the reactor for proper removal of moisture.

The polymerization temperature may be about 25 to about 500° C., or about 25 to about 200° C., or about to about 150° C. Further, the polymerization pressure may be from about 1 to about 100 Kgf/cm², preferably from about 1 to about 50 Kgf/cm², more preferably from about 5 to about 30 Kgf/cm².

The supported metallocene catalyst can be injected after being dissolved or diluted in an aliphatic hydrocarbon solvent having 5 to 12 carbon atoms such as pentane, hexane, heptane, nonane, decane, and isomers thereof, an aromatic hydrocarbon solvent such as toluene and benzene; or a hydrocarbon solvent substituted with chlorine atom such as dichloromethane and chlorobenzene. It is preferable that the solvent is used after a small amount of water, air or the like acting as a catalyst poison is removed by treating with a small amount of aluminum. It may also be performed using an additional cocatalyst.

The polyethylene according to one embodiment of the invention is produced by polymerizing an ethylene monomer using the catalysts of Chemical Formulas 3 to which mainly polymerize a low molecular weight polymer chain together with the catalyst of Chemical Formula 1 which mainly polymerizes a high molecular weight polymer chain.

Further, since it can be variously changed by adjusting the type and content of the first and second metallocene compounds, the amount of hydrogen gas introduced, the content of comonomer, and the presence/absence of addition of the molecular weight regulator, it is possible to produce the polyethylene having the desired physical properties. That is, the reactivity of the first and second metallocene compounds to hydrogen and the molecular weight regulator are different, respectively. Therefore, the polyethylene having the physical properties as described above can be prepared depending on the selective combination of the metallocene compound in a reactor, the amount of hydrogen gas introduced, and the presence/absence of addition of a molecular weight regulator.

The polyethylene thus prepared has a wide melt flow index and melt flow ratio and thus is excellent in processability, and at the same time, it has low entanglement molecular weight and high environmental stress crack resistance. Therefore, it can be very suitably used as food containers, bottle caps or the like that require stability in high-pressure and high-temperature environments.

Meanwhile, in other embodiment of the invention, the method for evaluating injection physical properties of a plastic resin includes the steps of:

measuring a melt index (MI) value of a plastic resin specimen;

measuring a steady flow viscosity value of the plastic resin specimen; and deriving a shear thinning index value from the steady flow viscosity value according to a viscosity model equation; and predicting injection pressure using the melt index value and the shear thinning index value.

The present inventors have found that, after making a hypothesis that in an injection molding process of a plastic resin, the injection pressure is related to the rheological properties of the corresponding plastic resin, it is possible to accurately derive actual injection suitability through specific factors that can be measured using plastic resin specimens, thereby completing the present invention.

According to one embodiment of the invention, it may be desirable to use, as the melt index value, a value measured according to ASTM D1238 Condition E at a temperature of about 190° C. and a load of about 2.16 kg.

The steady flow viscosity value may preferably be measured as a function value which changes together as the shear rate increases or decreases in the range of about 0.05 to about 500 rad/s. More specifically, it may be desirable to measure the steady flow viscosity value in the region where the steady flow viscosity decreases as the shear rate increases, that is, in the region of shear thinning behavior which is a type of non-Newtonian behavior that does not follow Newton's law of viscosity.

According to another embodiment of the invention, in the step of deriving a shear thinning index value from the steady flow viscosity value according to a viscosity model equation, the shear thinning index value may be preferably derived by plotting a shear rate value versus a steady flow viscosity value according to any one or more viscosity model equations of a Power-law model, a Cross model, a Carreau model, and a Carreau-Yasuda model.

As an example, a Power-Law model, which is one model for explaining non-Newtonian behavior of viscous fluid, may be represented by the following Equation 1.

$$\eta(\gamma)=k\gamma^{n-1} \quad \text{[Equation 1]}$$

in Equation 1, $\gamma$ is a shear rate value at the time of measuring the steady flow viscosity value, $\eta(\gamma)$ is a steady flow viscosity value which means the form of a function of a shear rate value, k is a consistency index, and n means a shear thinning index value to be obtained through measurement.

The consistency index (k) value is a value that can be varied depending on the rheological properties in the shear flow of the material.

That is, when Power-law model is used, the consistency index value and the shear thinning index value in the above equation can be derived by a method of measuring the shear rate value versus the steady flow viscosity value in the above equation and then substituting the measured value into the function represented by Equation 1. Among them, the shear thinning index value is used for predicting injection pressure.

As another example, a Cross model, which is one model for explaining non-Newtonian behavior of viscous fluid, may be represented by the following Equation 2.

$$\eta(\gamma)=\eta_o/\{1+(\lambda\gamma)^{1-n}\} \quad \text{[Equation 2]}$$

in Equation 2, $\gamma$ is a shear rate value at the time of measuring the steady flow viscosity value, $\eta(\gamma)$ is a steady flow viscosity value which means the form of a function of a shear rate value, $\eta_o$ is a viscosity value at zero shear rate, i.e., a zero-shear viscosity value, $\lambda$ is a relaxation time value, and n means a shear thinning index value to be obtained.

The relaxation time ($\lambda$) value is a value that can be varied depending on the rheological properties in the shear flow of the material.

That is, when a Cross model is used, the relaxation time value and the shear thinning index value in the above equation can be derived by a method of measuring the shear rate value versus the steady flow viscosity value in the above equation and then substituting the measured value into the function represented by Equation 2. Among them, the shear thinning index value is used for predicting injection pressure.

As still another example, a Carreau model, which is one model for explaining non-Newtonian behavior of viscous fluid, may be represented by the following Equation 3.

$$\eta(\gamma)=\eta_o/[\{1+(\lambda\gamma)^2\}^{(1-n)/2}] \quad \text{[Equation 3]}$$

in Equation 3, $\gamma$ is a shear rate value at the time of measuring the steady flow viscosity value, $\eta(\gamma)$ is a steady flow viscosity value which means the form of a function of a shear rate value, $\eta_o$ is a viscosity value at zero shear rate, i.e., a zero-shear viscosity value, $\lambda$ is a relaxation time value, and n means a shear thinning index value to be obtained.

That is, when a Carreau model is used, the relaxation time value and the shear thinning index value in the above equation can be derived by a method of measuring the steady flow viscosity value versus the shear rate value in the above equation and then substituting the measured value into the function represented by Equation 3. Among them, the shear thinning index value is used for predicting injection pressure.

Further, a Carreau-Yasuda model, which is one model for explaining non-Newtonian behavior of viscous fluid, may be represented by the following Equation 4.

$$\eta(\gamma)=\eta_o/[\{1+(\lambda\gamma)^a\}^{(1-n)/a}] \quad \text{[Equation 4]}$$

in Equation 4, $\gamma$ is a shear rate value at the time of measuring the steady flow viscosity value, $\eta(\gamma)$ is a steady flow viscosity value which means the form of a function of a shear rate value, $\eta_o$ is a viscosity value at zero shear rate, i.e., a zero-shear viscosity value, $\lambda$ is a relaxation time value, a is material constants, and n means a shear thinning index value to be obtained.

That is, when a Carreau-Yasuda model is used, the relaxation time value and the shear thinning index value in the above equation can be derived by a method of measuring the shear rate value versus the steady flow viscosity value in the above equation and then substituting the measured value into the function represented by Equation 4. Among them, the shear thinning index value is used for predicting injection pressure.

The model equations respectively represented by Equations 1 to 4 can be appropriately selected in accordance with the rheological properties and the shear thinning behavior characteristics of the plastic resin. In particular, when the plastic resin to be measured is polyethylene, it may be desirable to use a Carreau model for getting accurate prediction of the injection pressure.

The step of predicting injection pressure using the shear thinning index value and the flow index derived from the viscosity model equation may be performed using the following Mathematical Equation 1.

$$\text{Predicted injection pressure}= a(\text{MI}_{2.16})^{b}*(\text{STI})^{c} \quad \text{[Mathematical Equation 1]}$$

in Mathematical Equation 1, $\text{MI}_{2.16}$ is a melt index value as measured by according to ASTM D1238 Condition E, STI is a shear thinning index value derived according to the viscosity model equation, a may have a value of about 2200 to about 2500, b may have a value of about −0.1 to about −0.5, and c may have a value of from about 0.1 to about 0.5.

That is, after substituting the melt index value and the shear thinning index value into Equation 1 and introducing the values of a, b and c in accordance with the rheological properties and the shear thinning characteristics of the plastic resin, the injection pressure can be predicted based on a simple calculation formula.

More specifically, through the steps of measuring actual injection pressure values of some plastic specimens, measuring the MI value and STI value described above, and then substituting them into the function expressed by Mathematical Equation 1 described above to thereby derive the values of a, b, and c, it is possible to obtain a constant value of Mathematical Equation 1 and use it as a reference. In particular, in the case of Mathematical Equation 1 described above, taking a log on both sides of the function has the form of a linear simultaneous equation with three unknowns. Therefore, even when taking only at least three plastic resin specimens for which injection pressure is to be predicted, and performing measurement and calculation, accurate coefficient values can be derived, and these values can be used as references a, b, and c of various plastic resins.

In the case of the polyethylene resin, in Mathematical Equation 1, a may have a value of about 2200 to about 2500, preferably about 2250 to about 2350, b may have a value of about −0.1 to about −0.5, preferably about −0.2 to about −0.3, or about −0.2 to about −0.25, and c may have a value of about 0.1 to about 0.5, preferably about 0.35 to about 0.45, or about 0.4 to about 0.45.

However, the present invention is not necessarily limited to the ranges of a, b, and c described above, and each coefficient can be determined differently depending on the rheological properties of the plastic resin to be measured.

The method for evaluating injection physical properties according to one embodiment of the invention as described above can be applied for various plastic polymer resins produced in the form of injection molded products As an example, the method may be applied for a plastic resin wherein a melt flow index (MI) value is about 0.1 to about 1.5 g/10 min, preferably about 0.2 to about 1.1 g/10 min.

According to another embodiment of the invention, the method may be applied for a plastic resin wherein a shear thinning index value is about 0.1 to about 0.5, preferably about 0.2 to about 0.45.

Further, the method may be applied for a plastic resin wherein the predicted injection pressure value is about 1000 to about 2000 Pa, preferably about 1300 to about 2000 Pa, or about 1350 to about 1850 Pa. The injection pressure may be an injection pressure at about 235° C. and an injection speed of about 50 mm/s.

Further, the method may be applied for a plastic resin wherein a density value measured according to ASTM 1505 is about 0.94 to about 0.96 g/cm$^3$, preferably about 0.950 to about 0.955 g/cm$^3$.

Further, the method may be applied for a plastic resin wherein a number average molecular weight value is about 30,000 g/mol or less, preferably about 10,000 to about 20,000 g/mol, or about 12,000 to about 18500 g/mol.

And, specifically, it may be applied for various plastic resins processed into products through injection molding process, such as polystyrene-based resin, polyolefin-based resin, polyvinylchloride-based resin, poly(meth)acryl-based resin, polyamide-based resin, ABS-based resin, urethane epoxy-based resin, urethane acryl-based resin, amino resin, phenol resin and polyester-based resin, and the like, but in case applied for thermoplastic plastic resin, more exact evaluation results may be exhibited, and it may be preferably applied for polyolefin-based resin such as polyethylene and polypropylene resin, among them. It may be most preferably applied for polyethylene resin among them.

Hereinafter, preferred examples will be presented to facilitate understanding of the present invention. However, these examples are provided for a better understanding of the present invention only, and are not intended to limit the scope of the invention.

<Preparation Example of Metallocene Compound and Supported Catalyst>

Synthesis Example 1: Synthesis of First Metallocene Compound 1-1. Preparation of Ligand Compound.

2.331 g (10 mmol) of indenoindole was added to a dried 250 mL Schlenk flask, and 40 mL of ether was injected under argon. The ether solution was cooled up to 0° C. and then 4.8 mL (12 mmol) of 2.5 M nBuLi hexane solution was slowly added dropwise thereto. The reaction mixture was slowly warmed up to room temperature and then stirred until the next day. Another 250 mL Schlenk flask was filled with 20 mL of ether and then 3.6 mL (30 mmol) of dichloromethyl(tertbutoxyhexyl)silane was injected. The flask was cooled up to −78° C., to which a lithiated solution of indenoindole was injected through a cannula. After completion of the injection, the mixture was slowly warmed up to room temperature, and then stirred for about 5 hours and then stirred for one day. Then, the flask was quenched by adding ml of water, and the organic layer was separated and dried over MgSO$_4$. The ether used as solvent was removed under reduced pressure. It was confirmed by NMR that 10-((6-(tert-butoxy)hexyl)chloro(methyl)silyl)-5,8-dimethyl-5,10-dihydroindeno[1,2-b]indole having a purity of 95% or more was obtained.

After the synthesis of the indenoindole part was confirmed, 1.7 g (10 mmol) of ((1H-inden-3-yl)methyl)trimethylsilane was added to a dried 100 mL Schlenk flask and dissolved in 40 mL of ether. Then, 4.8 ml (12 mmol) of 2.5 M n-BuLi hexane solution was slowly added dropwise at −78° C. and stirred for one day. 10-((6-(tert-butoxy)hexyl)chloro(methyl)silyl)-5,8-dimethyl-5,10-dihydroindeno[1,2-b]indole previously synthesized was dissolved in 40 ml of ether and then a lithiated solution of ((1H-inden-3-yl)methyl)trimethylsilane was added dropwise at −78° C. After about 20 hours, the flask was quenched by adding 50 mL of water, and the organic layer was separated and dried over MgSO$_4$. The mixture obtained through filtration was subjected to a vacuum-reduced pressure to evaporate a solvent. As a result, 6.5 g (10.2 mmol, 100%) of 10-((6-(tert-butoxy)hexyl) (methyl) (3-((trimethylsilyl)methyl)-1H-inden-1-yl)silyl)-5,8-dimethyl-5,10-dihydroindeno[1,2-b]indo as a yellow oil was obtained.

Mw: 634.05, Purity (wt %)=100%

$^1$H NMR (500 MHz, CDCl$_3$): −0.40, −0.37 (3H, d), 0.017 (9H, m), 1.10 (4H, m), 1.18 (9H, s), 1.34 (6H, m), 2.41 (3H, m), 3.25 (2H, m), 3.25 (1H, m), 3.53 (1H, m), 4.09 (3H, s), 5.62, 5.82, 5.95, 5.95, 6.11 (1H, s), 7.04~7.32 (9H, m), 7.54 (1H, m), 7.75 (1H, m).

1-2. Preparation of Metallocene Compound

The ligand was added to an oven-dried 250 mL Schlenk flask, and then dissolved in ether, and 2.1 equivalents of nBuLi solution was added and lithiated until the next day. 1 Equivalent of ZrCl$_4$(THF)$_2$ was taken in a glove box and placed in a 250 ml Schlenk flask to prepare a suspension containing ether or toluene. The two flasks all were cooled down to −78° C. and then the ligand anion was slowly added to a Zr suspension. After completion of the injection, the reaction mixture was gradually warmed up to room temperature. When the metallization was successfully performed in this process, it was confirmed that a purple peculiar to the catalyst precursor appeared. After stirring for one day, toluene or ether in the mixture was removed up to a volume of about ⅕ through vacuum and reduced pressure, and hexane was added in a volume of about 5 times that of the remaining solvent. The reason for adding hexane at this time is to promote the crystallization because the synthesized catalyst precursor has reduced solubility in hexane. This hexane slurry was filtered under argon, filtered, and then both the filtered solid and the filtrate were evaporated under vacuum and reduced pressure. The remaining filter cake was weighed and sampled in a glove box to identify the synthesis, yield and purity. Ether was used as the solvent for metallization, and 6.08 g (76.5%) of a purple solid were obtained from 6.4 g (10 mmol) of ligand.

NMR standard purity (wt %)=100%, Mw=794.17

$^1$H NMR (500 MHz, CDCl$_3$): −0.23, −0.16 (9H, d), 0.81 (3H, m), 1.17 (9H, m), 1.20~1.24 (3H, m), 1.31 (2H, s), 1.62~1.74 (5H, m), 1.99~2.11 (2H, m), 2.55 (3H, d), 3.33 (2H, m), 3.95, 4.13 (3H, s), 5.17, 5.21, 5.32 (1H, s), 6.89~7.07 (3H, m), 7.12~7.21 (3H, m), 7.29 (1H, m), 7.36 (1H, m), 7.44 (1H, m), 7.84 (1H, m).

Synthesis Example 2: Synthesis of Second Metallocene Compound 2-1. Preparation of Ligand Compound 10.8 g (100 mmol) of chlorobutanol was added to a dried 250 mL Schlenk flask, to which 10 g of molecular sieve and 100 mL of MTBE were added and then 20 g of sulfuric acid was slowly added over 30 minutes. The reaction mixture slowly changed to pink over time. After 16 hours, it was poured into saturated sodium bicarbonate solution cooled in an ice bath. Ether (100 mL×4) was added to this mixture and extracted several times. The collected organic layers were dried over MgSO$_4$. After filtration, the solvent was removed under vacuum and reduced pressure. Thereby, 10 g (yield: 60%) of 1-(tertbutoxy)-4-chlorobutane in the form of yellow liquid was obtained.

$^1$H NMR (500 MHz, CDCl$_3$): 1.16 (9H, s), 1.67~1.76 (2H, m), 1.86~1.90 (2H, m), 1.94 (1H, m), 3.36 (2H, m), 3.44 (1H, m), 3.57 (3H, m)

4.5 g (25 mmol) of 1-(tertbutoxy)-4-chlorobutane synthesized above was added to a dried 250 mL Schlenk flask and dissolved in 40 mL of THF. 20 mL of sodium cyclopentadienylide THF solution was added slowly thereto and stirred for one day. 50 mL of water was added to the reaction mixture, quenched, and extracted with ether (50 mL×3). Then, the collected organic layer was sufficiently washed with brine. The remaining moisture was dried with MgSO$_4$, filtered, and then the solvent was removed under vacuum and reduced pressure. Thereby, 2-(4-(tert-butoxy)butyl)cyclopenta-1,3-diene in a dark brown viscous form was obtained in quantitative yield.

$^1$H NMR (500 MHz, CDCl$_3$): 1.16 (9H, s), 1.54~1.60 (4H, m), 1.65 (1H, m), 1.82 (1H, m), 2.37~2.42 (2H, m), 2.87, 2.92 (2H, s), 3.36 (2H, m), 5.99 (0.5H, s), 6.17 (0.5H, s), 6.25 (0.5H, s), 6.34 (0.5H, s), 6.42 (1H, s)

2-2. Preparation of Metallocene Compound 4.3 g (23 mmol) of the ligand compound synthesized in 1-1 was added to a dried 250 mL Schlenk flask and dissolved in 60 mL of THF. 11 mL of n-BuLi 2.0M hexane solution (28 mmol) was added thereto and stirred for one day. This solution was slowly added at −78° C. to a flask containing 3.83 g (10.3 mmol) of ZrCl$_4$(THF)$_2$ dispersed in 50 mL of ether.

When this reaction mixture was warmed up to room temperature, a turbid yellow color in a light brown suspension was changed in the form of a suspension. After stirring for one day, all solvent in the reaction mixture were dried and 200 mL of hexane was added. The mixture was sonicated and settled. The hexane solution floating on the upper layer was collected by decantation with cannula. The hexane solution obtained by repeating this process twice was dried under vacuum and reduced pressure. Thereby, it was confirmed that bis(3-(4-(tert-butoxy)butyl-2,4-dienyl)zirconium (IV) chloride was produced as a pale yellow solid.

$^1$H NMR (500 MHz, CDCl$_3$): 0.84 (6H, m), 1.14 (18H, s), 1.55~1.61 (8H, m), 2.61 (4H, m), 3.38 (4H, m), 6.22 (3H, s), 6.28 (3H, s)

Preparation Example 1: Preparation of Supported Catalyst 50 mL of toluene solution was added to a 300 mL glass reactor, to which 10 g of dried silica (SP 2410, manufactured by Grace Davison) was added and then stirred while raising the reactor temperature to 40° C. 60 mL of 10 wt % methylaluminoxane (MAO)/toluene solution was added thereto. After raising the temperature to 60° C., the mixture was stirred at 200 rpm for 12 hours. After lowering the reactor temperature to 40° C., stirring was stopped and settling was performed for 10 minutes, and then the reaction solution was subjected to decantation. Again, 100 mL of toluene was added thereto and stirred for minutes. Stirring was stopped and settling was performed for 10 minutes, and then the toluene solution was subjected to decantation.

50 mL of toluene was added to the reactor, 0.50 g of the metallocene compound of Synthesis Example 1 as a high molecular weight catalyst precursor and 10 mL of toluene were added to a reactor, and the mixture was stirred at 200 rpm for 60 minutes. 0.5 g of the metallocene compound of Synthesis Example 2 as a low molecular weight catalyst precursor and 10 mL of toluene were added to the reactor, and the mixture was stirred at 200 rpm for 12 hours.

Subsequently, stirring was stopped and settling was performed for 10 minutes, and then the reaction solution was subjected to decantation. 100 mL of hexane was added to the reactor, and the hexane slurry was transferred to a 250 mL Schlenk flask and the hexane solution was subjected to decantation, and dried under reduced pressure at room temperature for hours to prepare a hybrid supported metallocene catalyst.

Preparation of Ethylene/Alpha-Olefin Copolymer

Example 1

The catalyst was prepared by quantifying 50 mg of the supported catalyst prepared in Preparation Example 1 in a dry box, putting it in a 50 mL glass bottle, sealing the same with a rubber diaphragm, and taking the bottle out of the dry box. The polymerization was carried out in a 2 L metal alloy reactor equipped with a mechanical stirrer which enabled temperature control and was used at high pressure.

After putting 1 L of hexane containing 1.0 mmol of triethylaluminum and 1 mL of 1-butene in the reactor and adding the supported catalyst prepared above to the reactor without contacting with air, the polymerization was carried out for 1 hour while continuously providing ethylene monomer in the presence of hydrogen gas at 80° C. with the pressure of Kgf/cm$^2$. At this time, the amount of hydrogen introduced was 0.745 g (0.745 g/h).

The polymerization was terminated by first stopping stirring, and then venting and removing ethylene gas. Most of the polymerization solvent was removed from the obtained polymer by filtering the same, and the polymer was dried in a vacuum oven at 80° C. for 4 hours.

Examples 2 to 15

The polymerization reaction was carried out in the same manner as in Example 1, except that the amount of hydrogen introduced was changed as summarized in Table 1 below.

Preparation of Plastic Resin Specimen

Polyethylene resin of each Example was dried in a 40° C. vacuum oven overnight, and prepared in the form of a pellet using a twin screw extruder (BA-19, manufactured by BAUTECH).

The pellet-shaped resin obtained by compression was dried again in a vacuum oven at 40° C. overnight, and then, using Xplore 5.cc micro injection molding machine, the specimen was manufactured in the form adapted for the measurement conditions of each physical property.

Measurement of Physical Properties of Plastic Resin Specimen

The basic physical properties of the prepared specimen are as follows.

(The density was measured according to ASTM 1505, and the density values of all polyethylene resins used were 0.950 to 0.953 g/cm$^3$.)

1) Measurement of Number Average Molecular Weight and Low Molecular Content

The number average molecular weight and the molecular weight distribution were simultaneously or continuously measured by GPC-FTIR. The log value (log Mw) of the molecular weight (Mw) was taken as an x-axis, and the molecular weight distribution (dwt/d log Mw) of the log value was taken as a y-axis. The content of molecules having a molecular weight of 3500 g/mol or less was calculated as a fraction (%).

2) Melt Index (MI):

Measured according to ASTM 1238 at 190° C. under a load of 2.16 kg.

3) Measurement of Actual Injection Pressure

The polyethylene pellet prepared above was introduced into an injection machine (model name: Victory 1500, manufacturer: ENGEL), and the actual injection pressure was measured under the conditions of 240° C., holding pressure 650 bar, and injection speed 78 mm/s.

The above measured values are summarized in Table 1 below.

TABLE 1

| | Amount of hydrogen introduced (g/h) | Number average molecular weight (g/mol) | Low polymer content (%) | MI | Determination of injection suitability | Injection pressure measured (Pa) |
|---|---|---|---|---|---|---|
| Example 1 | 0.745 | 12033 | 6.30 | 0.854 | Suitable | 1540 |
| Example 2 | 0.865 | 17682 | 3.59 | 0.734 | Unsuitable | 1690 |
| Example 3 | 1.361 | 14840 | 3.89 | 0.238 | Unsuitable | 1820 |
| Example 4 | 1.099 | 11696 | 6.04 | 0.5 | Suitable | 1410 |
| Example 5 | 1.147 | 13224 | 5.57 | 0.452 | Suitable | 1450 |
| Example 6 | 1 | 12150 | 5.22 | 0.599 | Suitable | 1370 |
| Example 7 | 1.137 | 15037 | 3.73 | 0.462 | Unsuitable | 1660 |
| Example 8 | 1.022 | 13675 | 4.45 | 0.577 | Suitable | 1540 |
| Example 9 | 1.245 | 18448 | 2.46 | 0.354 | Unsuitable | 1790 |
| Example 10 | 1.277 | 18318 | 2.62 | 0.322 | Unsuitable | 1820 |
| Example 11 | 0.719 | 18126 | 2.04 | 0.88 | Unsuitable | 1600 |
| Example 12 | 0.709 | 13482 | 4.47 | 0.89 | Suitable | 1400 |
| Example 13 | 0.519 | 12631 | 5.08 | 1.08 | Suitable | 1380 |
| Example 14 | 0.739 | 12330 | 5.14 | 0.86 | Suitable | 1530 |
| Example 15 | 0.589 | 12526 | 4.91 | 1.01 | Suitable | 1510 |

4 Steady Flow Viscosity Value

The steady flow viscosity value was measured in the form of a function of the steady flow viscosity value according to the change of shear rate while changing the shear rate at 190° C., 0.5% strain in the region of 0.05 to 500 rad/s.

5) Derivation of Shear Thinning Index

The shear rate and steady flow viscosity value which were measured in the form of the function of the shear rate versus the steady flow viscosity value in the item 4) was substituted into the following Carreau model equation to thereby derive the shear thinning index value.

More specifically, in order for i) a Carreau model function value for the shear rate value of the measurement condition to ii) converge to the actually measured steady flow viscosity value, iii) the value of n in the following Equation was determined, which was derived as the shear thinning index value.

$$\eta(\gamma)=\eta_o/[\{1+(\lambda\gamma)^2\}^{(1-n)/2}]$$

6) Derivation of Predicted Injection Pressure

The injection pressure was predicted by substituting the melt index value and the shear thinning index value into the following Equation.

Predicted injection pressure = $a(MI_{2.16})^b * (STI)^c$ wherein, the values of a, b, and c are values corresponding to polyethylene, and the values of 2290.47147, −0.22201, and 0.42278 were used, respectively.

The above measured values are summarized in Table 2 below.

TABLE 2

| | Number average molecular weight (g/mol) | MI | Shear Thinning Index (nonunit) | Predicted injection pressure (Pa) | Injection pressure measured (Pa) |
|---|---|---|---|---|---|
| Example 1 | 12033 | 0.854 | 0.37671 | 1569.951 | 1540 |
| Example 2 | 17682 | 0.734 | 0.41739 | 1695.565 | 1690 |
| Example 3 | 14840 | 0.238 | 0.2613 | 1786.114 | 1820 |
| Example 4 | 11696 | 0.5 | 0.23494 | 1448.137 | 1410 |
| Example 5 | 13224 | 0.452 | 0.2294 | 1446.085 | 1450 |
| Example 6 | 12150 | 0.599 | 0.23611 | 1394.131 | 1370 |
| Example 7 | 15037 | 0.462 | 0.31824 | 1675.531 | 1660 |
| Example 8 | 13675 | 0.577 | 0.31299 | 1583.677 | 1540 |
| Example 9 | 18448 | 0.354 | 0.32276 | 1788.195 | 1790 |
| Example 10 | 18318 | 0.322 | 0.3166 | 1811.389 | 1820 |
| Example 11 | 18126 | 0.88 | 0.36971 | 1547.208 | 1600 |
| Example 12 | 13482 | 0.89 | 0.3023 | 1417.426 | 1400 |
| Example 13 | 12631 | 1.08 | 0.3443 | 1434.6 | 1380 |
| Example 14 | 12330 | 0.86 | 0.356 | 1530.484 | 1530 |
| Example 15 | 12526 | 1.01 | 0.371 | 1502.815 | 1510 |

Referring to Table 1, in the case of Examples determined to be suitable for injection according to an example of the present invention, the injection pressures applied in the actual injection process all have been found to be less than 1600 Pa, and if any one condition of the number average molecular weight value and the low molecular content was not satisfied, the actually measured injection pressures all have been found to exceed 1600 Pa.

This can be seen to clearly explain that the actual injection suitability of the polyethylene resin is directly related to the above-mentioned number average molecular weight value and the content of low molecules having a molecular weight value of 3500 g/mol or less.

Referring to Table 2, it can be clearly seen that the injection pressure predicted according to an example of the present invention has a value very similar to the actually applied injection pressure.

In particular, comparing the actual injection pressure with the predicted injection pressure value, it can be confirmed that the value of $R^2$ has a very high correlation close to 0.975, and this can be said to clearly explain that the actual injection pressure of the plastic resin is directly related to the aforementioned melt index value and shear thinning index value. This is because if the actual injection pressure of the plastic resin is not directly related to the above-mentioned melt index (MI) value and steady flow viscosity value, the predicted injection pressure value can not converge to the actual injection pressure value, regardless of how the coefficient values such as a, b, and c in Mathematical Equation 1 are adjusted, However, the actual injection pressure of the plastic resin has been clearly verified to have a first-order correlation with the injection pressure value predicted by Mathematical Equation 1. This can be said to clearly support that the actual injection pressure of the plastic resin has a direct correlation with the melt index value and the shear thinning index value which are physical properties related to the shear thinning properties of each plastic resin, regardless of the determined coefficient values such as a, b, and c used in Mathematical Equation 1, as suggested in the present invention.

The invention claimed is:

1. A method for evaluating injection physical properties of a plastic resin comprising the steps of:
    measuring a melt index (MI) value of a specimen of the plastic resin;
    measuring a steady flow viscosity value of the specimen of the plastic resin; and
    deriving a shear thinning index value from the steady flow viscosity value according to a viscosity model equation; and
    predicting injection pressure using the melt index value and the shear thinning index value according to Mathematical Equation 1, $$\text{predicted injection pressure} = a(MI_{2.16})^{b*}(STI)^c \qquad \text{[Mathematical Equation 1]}$$

in Mathematical Equation 1,
$MI_{2.16}$ is a melt index value as measured by according to ASTM D1238 Condition E,
STI is a shear thinning index value derived according to the viscosity model equation,
a has a value of 2200 to 2500,
b has a value of −0.1 to −0.5, and
c has a value of from 0.1 to 0.5.

2. The method for evaluating injection physical properties of a plastic resin according to claim 1, wherein the melt index value is measured according to ASTM D1238 Condition E at 190° C. under a load of 2.16 kg.

3. The method for evaluating injection physical properties of a plastic resin according to claim 1, wherein the steady flow viscosity value is measured as a value according to changes of the shear rate in the region of 0.05 to 500 rad/s.

4. The method for evaluating injection physical properties of a plastic resin according to claim 3, wherein the steady flow viscosity value is measured in the region where the steady flow viscosity decreases as the shear rate increases.

5. The method for evaluating injection physical properties of a plastic resin according to claim 1, wherein the shear thinning index value is derived by plotting a shear rate value versus a steady flow viscosity value according to any one or more viscosity model equations of a Power-law model, a Cross model, a Carreau model, and a Carreau-Yasuda model.

6. The method for evaluating injection physical properties of a plastic resin according to claim 1, wherein the melt index (MI) value is 0.1 to 1.5 g/10 min as measured at 190° C. under a load of 2.16 kg according to ASTM 1238.

7. The method for evaluating injection physical properties of a plastic resin according to claim 1, wherein the shear thinning index value is 0.1 to 0.5.

8. The method for evaluating injection physical properties of a plastic resin according to claim 1, wherein the predicted injection pressure value is 1000 to 2000 Pa.

9. The method for evaluating injection physical properties of a plastic resin according to claim 1, wherein a density value of the plastic resin measured according to ASTM 1505 is 0.94 to 0.96 g/cm$^3$.

10. The method for evaluating injection physical properties of a plastic resin according to claim 1, wherein the plastic resin is a polyethylene resin.

* * * * *